March 27, 1928.
J. VODICKA
1,663,673
CURTAIN FASTENER
Filed March 10, 1924
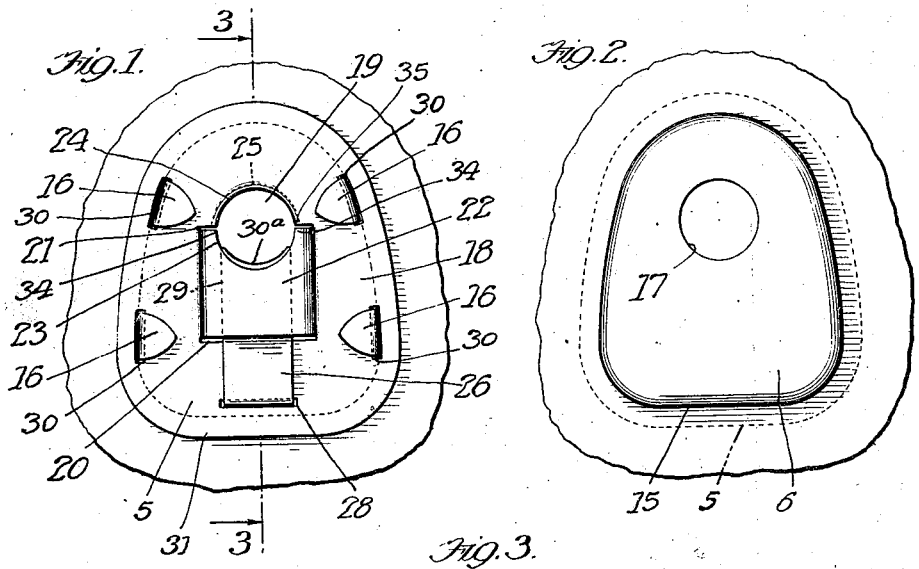
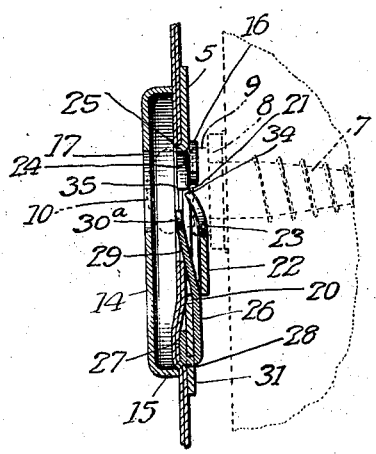
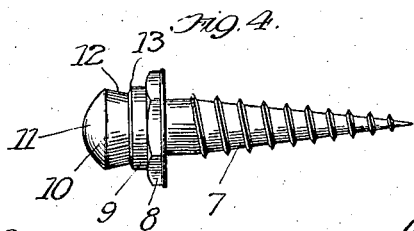

Patented Mar. 27, 1928.

1,663,673

UNITED STATES PATENT OFFICE.

JOHN VODICKA, OF CHICAGO, ILLINOIS, ASSIGNOR, BY MESNE ASSIGNMENTS, TO CINCH MANUFACTURING CORPORATION, OF CHICAGO, ILLINOIS, A CORPORATION OF ILLINOIS.

CURTAIN FASTENER.

Application filed March 10, 1924. Serial No. 698,016.

My improved fastener is of the type known as snap fasteners commonly employed in connection with automobile curtains. It provides a fastener of this type which securely holds the curtain to the headed post with which it cooperates preventing accidental detachment but permitting ready removal in the usual manner by inserting the fingers under the edge of the curtain and that of the fastener and tilting the latter with reference to the post. My improved fastener is durable, reliable and inexpensive to manufacture.

In the drawings accompanying and forming a part of this specification, Figure 1 is a rear or inside view of a portion of a curtain to which my improved fastener is applied; Fig. 2 is a front or outside view thereof; Fig. 3 is a section on the line 3—3 of Fig 1, the post with which the fastener cooperates being shown in dotted lines, and Fig. 4 is a side elevation of a post with which the fastener is adapted to engage.

The fastener as completed and ready for application comprises a rear member 5 and a front member 6. The post comprises a threaded shank 7, an angular nut 8, a short cylindrical section 9 and a head 10. For convenience of application of the fastener thereto the head is rounded as at 11 and tapers as at 12 toward the shoulder 13 on the cylindrical section so that there is formed a neck or annular recess beneath the head with which the fastener engages. The rear or inside member 5 of the fastener engages the headed post, the front member 6, which may be of any suitable form permitting the head of the post to extend through the rear member, serving mainly as a means for attaching the rear member to the curtain. In the form illustrated the member 6 consists of a substantially flat disk portion 14, the edge of which is rearwardly bent to form a flange 15, on the edge of which flange are lugs 16 which may be bent over to secure the parts together as will presently appear. An opening 17 is formed in the front member which, when the fastener is assembled, is in registry with the opening in the snap or rear member through which the post projects. In the broader aspect of the invention the front member is not essential and other means can be provided for securing the snap member to the curtain.

The snap or rear member comprises a plate 18 of resilient sheet metal in which is formed the eye or hole 19 for the head of the post. The plate 18 is slit at 20, 21 and struck up to form a raised bridge 22 which projects rearwardly from the plate. Substantially half of the circumference of the post hole or eye 19 is formed in this bridge as at 23. The other half of the circumference of the post hole at 24 is struck up forwardly or outwardly to form a narrow flange 25. A spring metal tongue 26 is secured to the plate 18 by passing the end 27 thereof through a slot 28 in the plate and bending it about the edge of the slot as well shown in Fig. 3. The other end of the tongue extends through the slot 20 and beneath the bridge 22, being bent slightly forward as at 29. The end of the tongue is formed on a concave arc $30^a$ and projects within the area of the post hole opening. The length of the tongue is such that the head of the post can pass between the same and the opposite edge of the post hole only by bending the tongue which, after the head has passed springs back to normal position shown in Fig. 3 in which it engages the neck of the post. The plate 18 is also provided with slots 30 for the purpose of securing the front and rear members together, the lugs 16 on the front member being passed through the slots in assembling and bent bent over as shown in Fig. 1. In attaching the fastener to the curtain the latter is perforated at a point to register with the post with which the fastener cooperates, the snap member applied to the curtain with its opening in registry with the curtain opening and with its broader end 31 towards the edge of the curtain and the front member 6 is then applied to the outer face of the curtain with the opening 17 therein in registry with the openings in the curtain and snap member respectively and pressed home, the lugs 16 entering the slots 30 referred to above after which the lugs are bent over as shown in Fig. 1.

In applying the fastener to the post the opening of the former is brought into register with the head of the post and then the fastener is pressed inward until, the tongue 29 yielding for the purpose, the head passes the tongue and the latter springs back to its normal position. The fastener is then securely held against separation from the post except by tilting the broad end of the fastener outward. When this is done the spring tongue, which is firmly braced by the bridge 22 yields towards the latter sufficiently to permit the head of the post to pass and then resume its normal position. It will be seen that when the fastener is in position on the post it can tilt only in the one direction. Tilting of the fastener in the opposite direction to that heretofore described is prevented by the engagement of the flange 25 with the head of the post and the edge of the bridge 22 with the cylindrical portion 9 of the post, these elements, as heretofore explained, being offset from each other with respect to the plane of the plate. Sidewise tilting of the plate is prevented by engagement of the corners 34 of the bridge and corners 35 of the flange 25 with the cylindrical portion and head respectively of the post. As the portions of the snap member just mentioned are rigid and directly engage the post it is impossible to separate the fastener from the post, except in the manner previously described without exerting such force on the fastener as to rupture the same. By making the fastener of metal of reasonable strength therefore it will securely hold the curtain against the strains to which it may be subjected, while at the same time it is readily separated from the post by tilting the edge of the curtain outward.

I claim:

1. In a curtain fastener of the class described, a snap member comprising a plate having a post-hole therein, the plate being slitted substantially diametrically with respect thereto on opposite sides of the post-hole and struck up so that a portion of the edge of the post-hole is out of the plane of the plate, and a spring tongue supported by said plate beneath the struck up portion, the end of said spring tongue extending into the area of the post-hole.

2. In a curtain fastener a snap-member comprising a plate having a post-hole therein, the plate being slitted on a line spaced from the post-hole and the section of the plate between said line and said post-hole struck up out of the plane of the main body to form a bridge so that the edge thereof forming a portion of the periphery of the post-hole is out of the plane of the body of the plate, and a spring tongue secured to the plate and passing through the slit, and the end of the tongue extending into the area of the post-hole.

3. In a curtain fastener of the class described, a snap member comprising a plate having a post-hole therein, the plate being slitted on opposite sides of the post-hole and a portion of the plate adjacent the slit and post-hole struck up out of the plane of the main body of the plate, the opposite edge of the post-hole being struck up to form a flange extending in the opposite direction from the plane of the plate, and a spring tongue secured to the plate and extending into the area of the post-hole.

4. In a curtain fastener, a snap member comprising a plate having a post-hole formed therein, the plate being slitted on opposite sides of the post-hole and on a line spaced from the post-hole and struck up intermediate the slits to form a bridge, and a spring tongue secured to the plate and extending beneath the bridge into the area of the post-hole.

JOHN VODICKA.